July 1, 1930.   T. LAUDER   1,769,351

CAKE RECEPTACLE

Filed Dec. 11, 1928

Inventor:
Therese Lauder,

Att'y.

Patented July 1, 1930

1,769,351

UNITED STATES PATENT OFFICE

THÉRÈSE LAUDER, OF NORWALK, CONNECTICUT

CAKE RECEPTACLE

Application filed December 11, 1928. Serial No. 325,340.

The present invention relates to cake receptacles and has particular reference to a type especially adapted to facilitate the cutting of a cake without first necessitating its removal from the receptacle.

In order to prevent the drying out of cakes, it has become common practise to keep them in more or less airtight receptacles, exposing them only at such times as they are to be cut for serving. This is particularly true in the case of cakes such as fruit cakes, which are consumed over a comparatively long period of time in the average household, and which must meanwhile be kept in a moist, palatable state.

The usual practise in so preventing a cake is to place it in an ordinary container having a bottom, sides integral therewith, and a tight fitting top usually secured by friction. When it is desired to cut the cake, the top of the receptacle must be removed and the cake then withdrawn from the container and placed on a plate or some other suitable flat surface before the cutting operation can successfully begin. This necessitates frequent handling of the cake with resulting damage in looks and appearance.

It is of course possible to cut the cake after the cover has been removed and while the cake is still in the container, but such an operation would be extremely cumbersome. The knife would have to be held in substantially vertical position and crumbling could thus scarcely be avoided. Also it would practically be impossible to remove the first few slices of a cake cut under such conditions, without effecting a substantial disintegration of the slices.

A general object of the present invention is the provision of a cake receptacle having a bottom or base which is especially adapted to act as a plate upon which the cake is cut.

Another object of the invention is the provision of a readily detachable receptacle base and cover, in which a portion of the attaching means acts as a hinge between the receptacle base and cover.

A further object of the invention is the provision of a substantially air-tight cake receptacle having a positively secured but readily detachable cover, and a base having a flat, raised, central portion.

These and other features of the invention will appear more fully from the following detailed description when read in connection with the accompanying drawings and will be pointed out in the appended claim.

Figure 1:
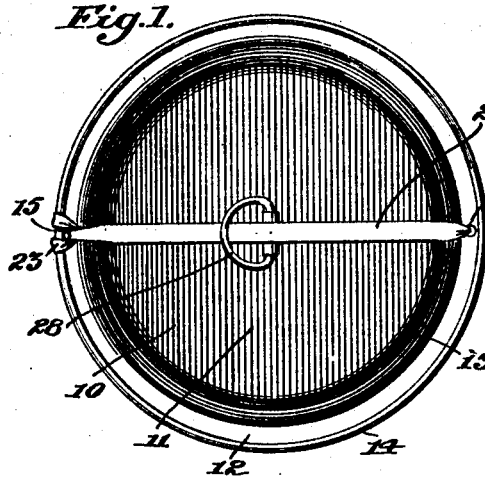
Fig. 1 is a bottom plan view of a cake receptacle embodying one form of my invention.

The device consists of a cover 16, having a flat outer rim 19, turned about its outer edge as shown at 20, inwardly inclined sides 18, and a flat integral top 17. The rim 19, is provided with oppositely disposed holes 21.

The base 10 consists of a flat rim 12, and a raised, flat central portion 11, joined by the inclined portion 13. The rim 12, is turned along its outer edge as shown at 14, and is provided with oppositely disposed holes 15.

Figure 2:
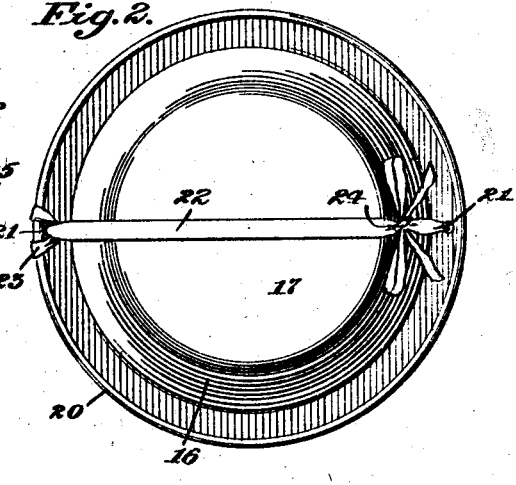
Fig. 2 is a top plan view of the device shown in Fig. 1.

In assembling the device, the base 10, is positioned below the cover 16, as shown in Fig 2. The rim 12, of the cover, engages the rim 19, of the receptacle body and the holes in the respective rims are made to coincide.

For the purposes of attachment, a string or tape 22, is then passed through one pair of the coinciding holes and looped in any suitable manner as shown at 23.

Following this, one end of the string is passed along the bottom of the base and inserted upwardly through the pair of holes opposite the loop 23. The other end of the string is passed above the cover 16, to meet the end protruding from the holes opposite the loop, and the two ends are there tied in a suitable bow or knot 24.

When the cake is to be cut, the receptacle is in upward position as shown in Fig. 2. The knot 24, is untied and the cover 16, tilted about the loop 23, which acts as a hinge. The end of the string passing through the holes opposite the loop, slips through the hole in the rim of the cover which is consequently free to move.

Figure 3:
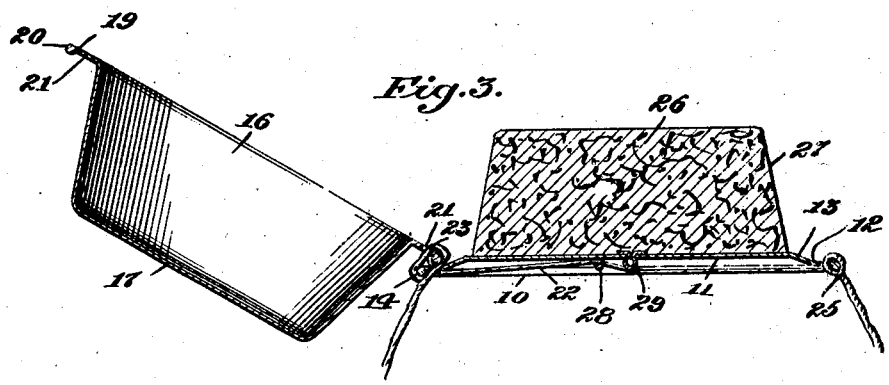
Fig. 3 is a vertical section of the cake receptacle in open position.

As the member 16, is tilted into the position shown in Fig. 3, the top of the base is completely exposed so that it may act as a plate upon which the cake is to be cut. The flat portion 11, of the base, is in raised position above the remainder of the base and complete access to the cake for purposes of cutting is accordingly had.

When it is again desired to close the receptacle, the member 16, is tilted into upright position on the base, the string is passed through the hole from which it slipped out in the opening operation, and the knot 24, is again tied.

In the assembling operation, the string may be looped about the hole 15, opposite the loop 23, as shown at 25. This is not essential, however, but may be done in order to keep the portion of the string adjacent the base, in proper position.

Fig. 3, shows a cake 26, upon the base 10. The sides 27, of the cake are suitably tapered in a manner similar to the tapering of the sides 18, of the cover 16, in order that the pivot motion of the member 16, may be readily effected without contact of the member 16, with the cake.

The base 10, is provided with a handle 28, secured by member 29. When the cake 26, has been consumed, the string 22, may be removed and the cover 16, be used as a pot or pan, the base 10, acting as a lid.

Having thus described my invention, what I claim as new and desire to secure by Letters Patent of the United States is as follows:

A cake receptacle, comprising in combination, a base member having a substantially flat raised central portion and an integral flange terminating in a flat rim below said raised central portion, a cover member having a top and sides flaring outwardly from the top to an open bottom, an outwardly extending flat rim surrounding the bottom edges of said cover member and having a pair of holes on substantially opposite sides of the median line of the cover member, the rim of the cover member being adapted to engage with the rim of the base the latter being provided with holes coinciding with the holes in the rim of the cover, and a flexible member looped about one pair of coinciding holes to form a hinge between the cover member and the base member, the central raised portion of the base member extending upwards towards the top of the cover member when the cover is in closed position, the flexible member being adapted to pass through the holes opposite the loop and encircling the bottom of the base and the top of the cover to hold said cover in closed position.

In testimony whereof, I have hereunto set my signature.

THÉRÈSE LAUDER.